Oct. 8, 1929.  H. C. HARRISON  1,730,424
MAGNETIC BALL OR ROLLER BEARING
Filed March 26, 1926
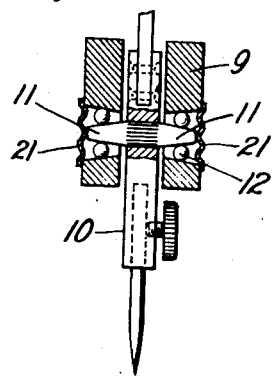
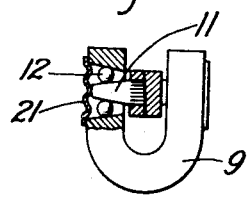
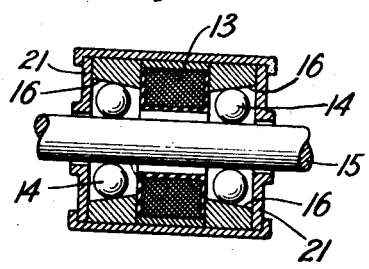
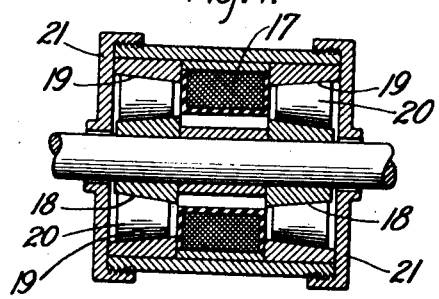
Inventor:
Henry C. Harrison
by Joel R. Palmer  Att'y Patented Oct. 8, 1929

1,730,424

UNITED STATES PATENT OFFICE

HENRY C. HARRISON, OF PORT WASHINGTON, NEW YORK, ASSIGNOR TO BELL TELEPHONE LABORATORIES, INCORPORATED, OF NEW YORK, N. Y., A CORPORATION OF NEW YORK

MAGNETIC BALL OR ROLLER BEARING

Application filed March 26, 1926. Serial No. 97,632.

This invention relates to bearings for rotating or oscillating members and more especially to such bearings which use balls, rollers, etc., between inner and outer races.

The object of this invention is to provide a bearing in which the intermediate bearing members are held in contact with both races so that each intermediate bearing member will assume its share of the bearing load.

This object is accomplished in the particular embodiment shown and described herein by positioning a source of magneto-motive force, the magnetic circuit of which includes the intermediate members, which may be balls or rollers, and by having at least one of the races tapered so that the balls or rollers are constantly held in contact with both of the races. The magnetic circuit may be established by a permanent magnet or by an electromagnet.

This invention will be better understood from the following description in connection with the attached drawing in which Fig. 1 represents such a bearing as applied to the stylus of a phonographic reproducer. Fig. 2 is a top view of the same, partly in section. Fig. 3 represents a bearing using balls for intermediate members and Fig. 4 represents a bearing in which rollers are used as the intermediate members.

Referring more particularly to Fig. 1, a stylus 10 of a reproducer which acts upon a diaphragm, not shown, has a conical shaped shaft 11 extending either side of it as shown.

A permanent magnet 9, seen more in detail in Fig. 2, is arranged with conical shaped openings of sufficient size to receive shaft 11 and balls 12. It will be readily seen that the shaft 11 and balls 12 are parts of the magnetic circuit and that the balls will be drawn into the narrower part of the space between the shaft and permanent magnet by magnetic force. Since these balls will therefore contact with both surfaces, each ball will receive its share of the load. It will also be seen that side motion of the stylus will be very materially reduced and that as the balls wear they will move toward the stylus, always keeping in contact with the surfaces and thereby prolonging the life of the stylus bearing.

It is to be understood that the shaft 11 may be a permanent magnet and the magnetic circuit completed as desired.

The bearing represented in Fig. 3 is for a larger shaft and since the magneto-motive force required in such a case is greater than can normally be supplied by a permanent magnet of a suitable size, an electromagnet having windings 13 is used. In this case the balls 14 have as the inner race the outer surface of the shaft 15, the outer race 16, being at an angle to the axis of the shaft. Here again the outer race, balls and shaft form parts of the magnetic circuit and the balls are kept in contact with these surfaces through the magnetic force set up by the electromagnet.

For bearings, where it is desired to use rollers, a bearing such as that shown in Fig. 4 is used. Here again an electromagnet having a winding 17, is used for establishing the proper magnetic circuit. In this case, as is well known, the inner and outer races, 18 and 19 respectively, must be at an angle to the axis of the shaft, and these angles must be equal. Also the angle of the cone of the rollers must be twice the angle of either surface to the axis of the shaft. The rollers 20 in this bearing have the same function as the balls in the previously described bearings and will act in the same way; that is, any inequalities in size of the rollers will not keep the rollers from taking their portion of the load since the magnetic force will draw these rollers to the narrow space between the races and hence keep the rollers in contact with both races. Such a bearing, that is, with both races at an angle to the axis of the shaft, is not limited to rollers but may also make use of balls.

Throughout the specification and in the appended claims it is to be understood that the inner race may be the outer surface of the moving element which is supported in a bearing.

In addition to the advantages of the ordinary ball or roller bearings, the bearings of this invention are very much less noisy due to the lack of play between parts, and are much more efficient since each ball or roller is kept in contact with the races regardless of size variations and inequality of wear.

It is desired to point out that in all bearings of this type it is preferable to have a maximum of lines of force pass through the balls or rollers as the case may be. To facilitate this, the bearing covers 21 are of nonmagnetic material or of a material offering a high reluctance to the magnetic circuit.

What is claimed is:—

1. An anti-friction bearing comprising two relatively rotatable parts mounted in concentric relation, and two sets of frictionless bearing members located between the rotatable parts at opposite ends thereof and retained in operative position longitudinally of the rotatable parts by magnetic force.

2. An anti-friction bearing comprising two relatively rotatable parts mounted concentrically and having a longitudinally tapered relation to each other, and frictionless bearing members retained in a tapered space between the rotatable parts and in operative position longitudinally thereof by magnetic force.

3. An anti-friction bearing comprising two relatively rotatable parts mounted concentrically, and having a tapered space between them, and roller bearing members mounted in the tapered space and retained in operative position with respect to the longitudinal axis of the rotatable parts by magnetic force.

4. An anti-friction bearing comprising two relatively rotatable parts mounted concentrically and one at least of which is tapered with respect to the other, and two sets of anti-friction bearings located at opposite ends of the bearing surfaces retained in operative position longitudinally of the two members by magnetic force.

In witness whereof, I hereunto subscribe my name this 25th day of March A. D., 1926.

HENRY C. HARRISON.